United States Patent [19]

Ikeda et al.

[11] Patent Number: 4,903,085
[45] Date of Patent: Feb. 20, 1990

[54] AUTOMATIC ORIGINAL CIRCULATING AND FEEDING APPARATUS

[75] Inventors: Sunao Ikeda; Shiro Saeki, both of Yokohama, Japan

[73] Assignee: Ricoh Company, Ltd., Tokyo, Japan

[21] Appl. No.: 177,460

[22] Filed: Apr. 1, 1988

[51] Int. Cl.⁴ .............................................. G03G 15/00
[52] U.S. Cl. ................................. 355/320; 355/308; 355/318; 271/3.1; 271/9
[58] Field of Search ............... 355/35 H, 14 SH, 23, 355/24, 26, 308, 318, 319, 320; 271/3.1, 4, 9, 225, 276, 301, 65

[56] References Cited

U.S. PATENT DOCUMENTS

| | | | |
|---|---|---|---|
| 1,291,089 | 1/1919 | Novick | 271/9 |
| 2,162,706 | 6/1939 | Dodds | 120/32 |
| 2,617,647 | 11/1952 | Davis | 271/9 |
| 3,072,397 | 1/1963 | Kelchner | 271/53 |
| 3,218,064 | 11/1965 | Davidson, Jr. et al. | 271/45 |
| 3,555,978 | 1/1971 | McCool | 93/93 |
| 3,597,076 | 8/1971 | Hubbard et al. | 355/29 |
| 3,598,396 | 8/1971 | Andrews et al. | 271/9 |
| 3,774,906 | 11/1973 | Fagan et al. | 271/64 |
| 3,830,590 | 8/1974 | Harris et al. | 355/102 X |
| 3,886,329 | 5/1975 | Kamiyama | 235/92 SB |
| 3,924,846 | 12/1975 | Reed | 270/56 |
| 3,930,581 | 1/1976 | Gray | 209/73 |
| 3,979,112 | 9/1976 | Munn et al. | 270/58 |
| 3,980,296 | 9/1976 | Craft et al. | 271/251 |
| 4,049,256 | 9/1977 | Church et al. | 271/9 |
| 4,052,054 | 10/1977 | Cardwell et al. | 271/227 |
| 4,078,787 | 3/1978 | Burlew et al. | 271/3.1 |
| 4,105,914 | 8/1978 | Murata et al. | 235/92 SB |
| 4,124,204 | 11/1978 | Vanbuskirk | 271/173 |
| 4,128,756 | 12/1978 | Nagano et al. | 235/92 SB |
| 4,146,216 | 3/1979 | Brown | 270/58 |
| 4,179,117 | 12/1979 | Rhodes, Jr. | 271/251 |
| 4,200,386 | 4/1980 | Queener | 271/4 X |
| 4,201,378 | 5/1980 | Hams | 271/261 |
| 4,201,464 | 5/1980 | Botte et al. | 355/14 R |
| 4,203,585 | 5/1980 | Kunz et al. | 271/4 |
| 4,204,663 | 5/1980 | Baughn et al. | 254/88 |
| 4,211,483 | 7/1980 | Hannigan et al. | 271/288 X |
| 4,227,074 | 10/1980 | Miyagawa | 235/92 SB |
| 4,229,100 | 10/1980 | Travis | 355/77 |
| 4,231,567 | 11/1980 | Ziehm | 271/259 |
| 4,247,193 | 1/1981 | Kaneko et al. | 355/14 R |
| 4,273,326 | 6/1981 | Snellman et al. | 271/288 |
| 4,285,508 | 8/1981 | Kaneko | 271/4 |
| 4,285,591 | 8/1981 | Botte et al. | 355/14 C |
| 4,286,865 | 9/1981 | Satomi et al. | 355/14 CU |
| 4,297,025 | 10/1981 | Bach et al. | 355/145 H |
| 4,341,462 | 7/1982 | Ogura | 271/4 X |
| 4,419,007 | 12/1983 | Kingsley | 271/DIG. 9 X |
| 4,456,236 | 6/1984 | Buddendeck | 355/24 X |
| 4,457,506 | 7/1984 | Ashbee et al. | 271/3.1 |
| 4,579,326 | 4/1986 | Pinckney et al. | 271/3.1 |
| 4,674,866 | 6/1987 | Tanaka | 355/24 X |
| 4,688,928 | 8/1987 | Iwai | 355/14 SH |
| 4,699,365 | 10/1987 | Smith et al. | 355/145 H X |
| 4,723,772 | 2/1988 | Honjo et al. | 271/3.1 |

FOREIGN PATENT DOCUMENTS

| | | |
|---|---|---|
| 5417093 | 2/1979 | Japan . |
| 5566432 | 5/1980 | Japan . |
| 2059396 | 4/1981 | United Kingdom . |
| 2084964 | 4/1982 | United Kingdom . |

*Primary Examiner*—A. C. Prescott
*Attorney, Agent, or Firm*—Oblon, Spivak, McClelland, Maier & Neustadt

[57] ABSTRACT

An automatic original circulating and feeding apparatus comprises an original feeding base for receiving a plurality of originals thereon, which are piled-up with image-faces thereof downwardly, an original separating and feeding device for separating and feeding piled-up originals one by one, a belt conveyor device disposed in an exposure portion for exposing each of the originals, a turning over and conveyor device disposed at downstream of the belt conveyor device in the carrying direction, a discharging and carrying device disposed to connect the turning over and conveyor device with the original feeding base, and a switchback turning over and conveyor device disposed along an original passage provided in the discharging and carrying device.

1 Claim, 7 Drawing Sheets

AUTOMATIC ORIGINAL CIRCULATING AND FEEDING APPARATUS

BACKGROUND OF THE INVENTION

This invention relates to an automatic original circulating and feeding apparatus in a copying machine.

Some of the conventional copying machines is provided with an automatic original circulating and feeding apparatus, i.e. what is called RADF, which, for the purpose of improving the original processing capacity of a copying machine, permits a plurality of originals to be copied in a plurality of cycles by causing the originals to be automatically fed and recovered cyclically.

The RADF of this operating principle is generally provided with a frictional type paper separating mechanism for successively separating one by one originals piled up on an original feeding base from the lowermost original and forwarding them one by one to the copying machine.

Now, the conventional RADF is considered here as applied to the copying of double-faced originals. These double-faced originals piled up in the consecutive order of page numbers are set on the original feeding base in such a manner that the first page will form the uppermost original turned upwardly and the originals will be forwarded to the copying machine in the reverse order of page numbers. In this case, since the last page which is copied first is turned downwardly on the original feeding base, it must be turned upside down before it is forwarded onto a contact glass and set in the copying position. This is because the penultimate page constitutes itself a downwardly turned copy surface on the contact glass when this conveyance of the page is made on a turn feed route. The original in this state, therefore, is turned upside down on a switchback type route so that it will be placed on the contact glass with the last page turned downwardly. This operation inevitably requires each original to be conveyed and set through an idle step which has no part at all in the actual copying machine, entailing waste of time and impairing efficiency of the copying operation. Again when the penultimate page is to be copied, the same original must be sent through the same route before it is set on the contact glass. While one original is being copied, none of the feed routes is allowed to admit the next original. Thus, the conventional RADF necessitates a waiting time and, in this respect, operates with a slow processing rate. Particularly when the copying machine proper is capable of a high-speed processing, it is compelled to be operated at a lowered speed because the RADF of such a slow processing rate cannot keep pace with the high-speed operation of the copying machine. As the result, the use of the RADF prevents any effort to improve the CPM (copies per minute; efficiency of copying work).

When the double-faced originals are piled up consecutively in the order of page numbers with each of the originals turned upside down, the originals can be forwarded solely through a feed route to the copying machine. This setup, however, entails troublesome work by causing all the originals to set severally upside down.

Even in the case of single-faced originals, they are fed out and recovered consecutively in the order of page numbers with the original-bearing face of each original turned upwardly. Since the time to start feeding the next original is restricted for the purpose of preventing two originals from passing each other on the contact glass, this arrangement also impedes the improvement of CPM.

SUMMARY OF THE INVENTION

In the light of the true state of affairs of the prior art described above, this invention aims to provide an automatic original circulating and feeding apparatus which the originals are set as turned downwardly and fed out consecutively in the order of page numbers, enables the original feeding work to be carried out at a speed matched to the speed of the continuous operation of the copying machine proper, thereby permitting the improvement of the CPM.

The present invention provides an automatic original circulating and feeding apparatus comprising an original feeding base for receiving a plurality of originals thereon, which are piled up with image faces thereof downwardly, an original separating and feeding mechanism for successively separating the piled-up originals on the original feeding base one by one from a lowermost original and feeding them one by one in the order separated, a belt conveyor mechanism disposed in an exposure portion for exposing each of the originals, a turning over and conveyor mechanism disposed at downstream of the belt conveyor mechanism in the carrying direction of the belt conveyor mechanism, a discharging and carrying means disposed to connect the turning over and conveyor mechanism with the original feeding base, and a switchback turning over and conveyor mechanism disposed along an original passage provided in the discharging and carrying means at a position spaced equal to or more than the maximum length of the originals from the stop position of the tip of the originals provided in the exposure portion.

According to the automatic original circulating and feeding apparatus of this invention, which has the above-described construction, the carrier speed at the separating and feeding mechanism is an optimum speed to secure the separating function. However, when a plurality of originals undergo copying in the order of page, the copy carrying speed at the exit thereof is increased so as to match the original processing speed of the copying machine and continuously feed the originals, ameliorating CPM. In this case, since the speed is increased in the discharge line where the mechanical load is light, there is less trouble in terms of torque and noise. In addition, it is feasible to process the originals by selecting the optimum original passage in accordance with copying process mode. Particularly, in copying the double-faced originals, the wasteful empty carrier and the unnecessary original passage or document passage can be eliminated.

DESCRIPTION OF THE PREFERRED EMBODIMENT

This invention is not limited to the embodiments to be specifically cited herein. It may be practised as modified or altered or altered in numerous ways without departing from the spirit of the invention.

First, the conventional countertype will be described in detail below for clarifying the distinction of the present invention.

Figure 13:
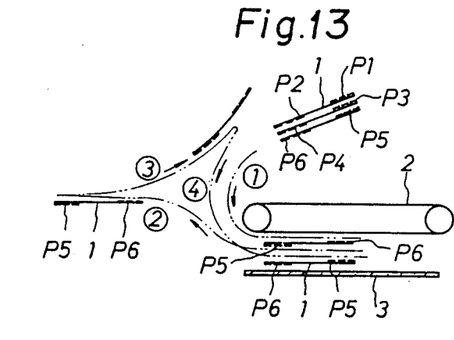
FIG. 13 is a view to help explain the original passing route of the conventional example when the double-faced originals are copied.

When double-faced originals 1 are to be copied as illustrated in FIG. 13, these double-faced originals or documents 1 are consecutively set in the order of page numbers as indicated by P1-P6 with the first page P1 lying in the uppermost position as turned upwardly and they are fed out in the reverse order of page numbers, with the sixth page P6 to be copied first. Here, the sixth page P6 to be copied first is turned downwardly on the original feeding base, it must be turned upside down so as to be forwarded to and readied for copying on a contact glass 3 which is provided with a conveyor belt 2. Otherwise, the fifth page P5 constitutes itself a downwardly turned copy face on the contact glass 3 when the sheet bearing the sixth page P6 is conveyed along a turn feed route as indicated by ①. Thus, the original 1 as held in the state mentioned above is turned upside down by means of a switch-back type feed route as indicated by ②, ③, and ④ so that the sixth page P6 will be forwarded to and set on the contact glass 3 as turned downwardly. This means that the original is forwarded and set by being passed through an idle step which has no part at all in the actual copying work, entailing a waste of time and impairing the efficiency of copying work. When the fifth page P5 is to be subsequently copied, the same original bearing the fifth original must be similarly passed through the feed route as indicated by ②, ③, and ④ before it is set on the contact glass 3. Further, the feed route as indicated by ①, ②, ③, and ④, while one original 1 is being copied, is not allowed to admit the next original. Thus, this setup necessitates a waiting time period and, in this respect, operates at a low processing rate. Particularly when the copying machine proper is capable of a high-speed processing, it is compelled to be operated at a lowered speed because the RADF of such a slow processing rate cannot keep pace with the high-speed operation of the copying machine. As the result, the use of the RADF prevents any effort to improve the CPM (copies per minute; efficiency of copying work).

When the double-faced originals 1 are piled up in the descending order of P2, P1, P4, P3, P6, and P5 with respect to the diagram of FIG. 13, the originals may be processed only through the feed route of ①. This setup, however, entails a disadvantage that all the originals ① must be set as arranged in the aforementioned order.

Figure 14:
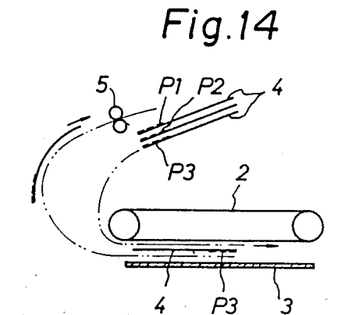
FIG. 14 is a view to help explain the original passage of the conventional type when the single-faced originals are copied.

Even in the case of single-faced originals 4, they are set consecutively in the order of page numbers with the image faces thereof turned upwardly as illustrated in FIG. 14, then forwarded through the feed route of ① in the reverse order of page numbers, and discharged and recovered through the feed route of ④ via a discharge roller 5. The time to start feeding the next original is restricted for the purpose of preventing two originals from passing each other on the contact glass 3. Thus, this setup enjoys no improvement with respect to CPM.

Now, the present invention will be discussed more specifically below with reference to preferred embodiments illustrated in the accompanying drawings.

In FIGS. 1-6, there is provided a RADF 12 covering the contact glass 11 disposed at the top surface of the copying machine 10. In the RADF 12, there is provided a conveyor mechanism 17 which is constituted by a carriage belt 16 supported between a drive roller 13 and a driven roller 14 and having plural presser rollers 15 therebetween. At the right hand upstream of the belt conveyor mechanism 17, there are provided an original feeding base 18 which is directed toward the contact glass 11, and an original separating and feeding mechanism 19. The original feeding base 18 is inclined toward said contact glass 11, and plural originals 20 are piled-up in the order of page with image faces downward. There are attached movable side fences 21 to the original feeding base 18 so as to position said notes in the cross direction. On the other hand, said original separating and feeding mechanism 19 is located between the original feed base 18 and the contact glass 11, and has a paper passage or original passage 22 which is continuous from the piling surface of the original feeding base 18 to said contact glass 11. And, there are provided a semicircular calling roller 23 disposed under said original feeding base 18, and a Mylar film 24 for pressing the original 20 onto the calling roller 23. Furthermore, there are provided a separating roller 25, and a separating blade 26 contacted to the separating roller 25 with some pressure. Near the contact glass 11, there are provided a pair of pull-out rollers 27 and 28.

Figure 1:
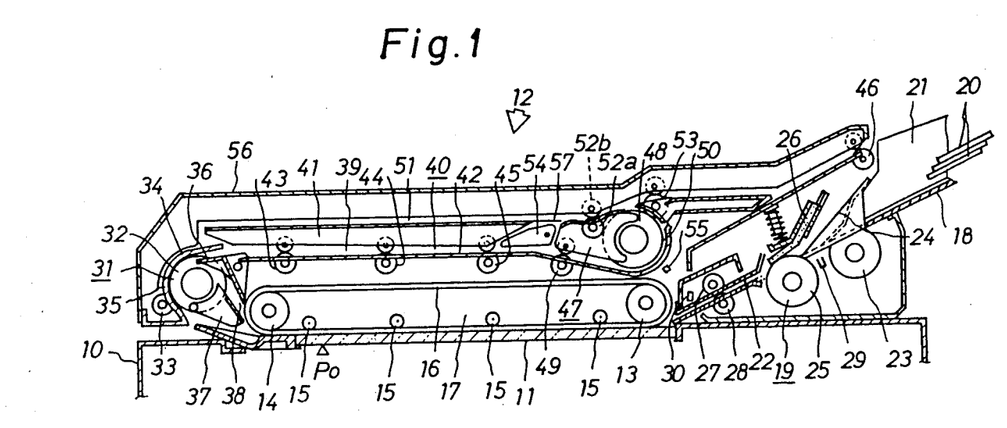
FIG. 1 is a side view showing an apparatus for the scanning mode.

Between the calling roller 23 and the separating roller 25, there is provided an original sensor 29, and at a position just before the contact glass 11, there is provided an original sensor 30, too. At the left hand, or the downstream, or said belt conveyor mechanism 17, there is provided a turning over and conveyor mechanism 31. The turning over and carrying mechanism 31 is mainly constituted by a turn roller 32 of large diameter, and there is formed a turning over passage 35 along the outer circumference of the turn roller 32 by a feed roller 33 and a turn guide 34 which are contacted with the turn roller 32. At the exit of the turning over passage 35, there is rotatably provided a switching gate 36 for switching the conveyance or original passage of the originals, and at the driven roller 14 side of the turn roller 32, there is provided a guide click 37, so that there is formed a reversing passage 38, which is directed toward said contact glass 11, along the inner periphery of the turn roller 32 (the side of the transfer belt 16).

And, there is also provided a discharging and carrying means 40 which includes a discharge passage 39 connecting approximately horizontally the exit of the turning over and carrying mechanism 31 where said switching gate 36 is provided, to the upper portion of said original feeding base 18. Said discharging and carrying means 40 is constituted by guide members 41 and 42, and there are provided plural pairs of carrier rollers 43, 44, and 45 while near the copy feeding stand 18, there is provided a discharge roller 46.

Then, at an intermediate point of the discharge passage 39 of the discharging and carrying means 40, there is provided a switchback turning over and conveyor mechanism 47 for selectively passing the paper or document. The switchback turning over and conveyor mechanism 47 comprises: a turn roller 48 whose diameter is almost the same as said turn roller 32; a pair of carrier rollers 49 for directing the original document conveyance after the rollers 45 to the turn rollers 48; a turn passage 50 around the turn roller 48; a switchback passage 51 continuous to the turn passage 50 and parallel to said discharge passage 39 above said carrier belt 16; pairs of oscillating rollers 52a, and driven rollers 52b located near the switchback passage 51 and said turn roller 48, and moved and driven with the axis of the turn roller 48 as the rotation center; and a pair of rollers 53 which constitutes a set of three rollers with said turn roller 48 near the exit, facing the discharge roller 46, of the discharge passage 39. At the upstream of the turn roller 48, there is pivotably provided a switch claw 54 as a switching gate means for selectively switching the conveyance passage of the originals 20 which are carried to the conveyance roller 45, namely selecting either the turn passage 50 or a normal discharge passage 39. And, here is provided a document sensor 55 so as to face said turn passage 50. Said switchback passage 51 is formed by the top end of said guide 41 and a part of the detachable RADF cover 56. 57 indicates a Mylar film for preventing the flow back provided between the switching claw or gate 54 and the switchback passage 51.

Now the drive and transmission system of the turning over and conveyor mechanism 31, the discharging and carrying mechanism 40, and the switchback turning over and conveyor mechanism 47 will be described with respect to FIG. 2. In the vicinity of the turn roller 32, there is provided a motor 58. To the drive pulley 59 of the motor 58, the pulley 60 of the turn roller 32, and the pulleys 61, 62, and 63 corresponding to the carrier rollers 43, 44, and 45 (each is on the bottom side) are connected by the timing belt 65 via a presser guide roller 64. And, to the drive pulley 66 of the motor 58, there is connected a pulley 67 corresponding to the feed roller 33 by the belt 68.

On the other hand, on the shaft of the turn roller 48, there is provided a motor 69, and there is provided a gear 71 engaged with the drive gear 70 of the shaft 48 with the roller 53 (bottom side). On the shaft of the roller 53, there is provided a pulley 72, and there is provided a belt 74 between the pulley 72 and the pulley 73 of the shaft of said roller 49 (lower side). There is provided a pulleyed belt 76 between the pulley 75 of the discharge roller 46 and said pulley 72.

The drive motor 13 of the conveyance belt 16 is driven by its own motor. Likewise, the calling roller 23 of original separating and feeding mechanism 19, the separating roller 25, and the like are actuated by their own motors.

In this particular embodiment, an original is fixed and an optical exposure scanning method, for example, is employed, and the stop position of the tip of the original 20 on the contact glass 11 is set to Po. This stop position Po is spaced upstream from the presser roller 15 nearest to the driven roller 14 by the distance l1.

Figure 3:
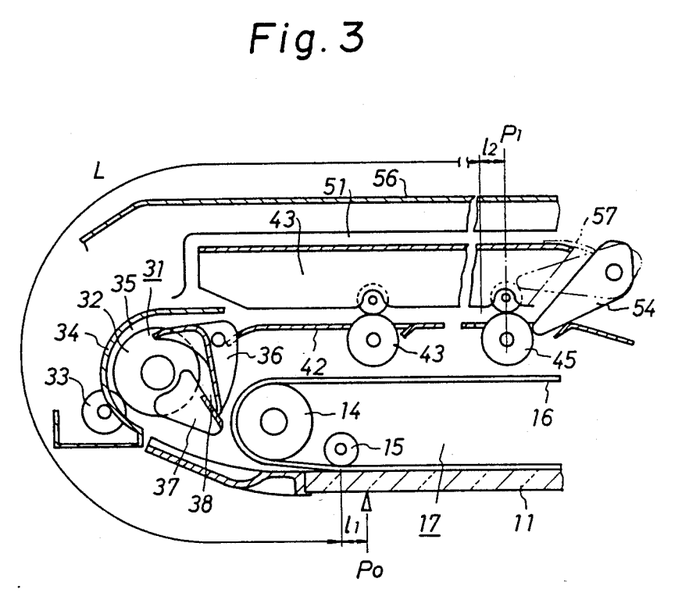
FIG. 3 is an enlarged side elevation showing a turning over and carrying mechanism of the embodiment shown in FIG. 1.
Figure 4:
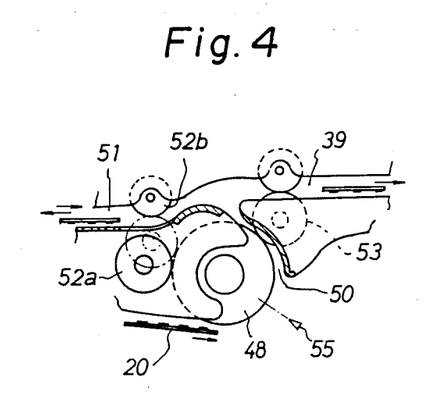
FIG. 4 is an enlarged side elevation depicting a switchback turning over and carrying mechanism of the embodiment shown in FIG.

Now, the position of said switchback turning over and carrying mechanism 47 will be described. As shown in FIG. 3, it is apart from the document stop position $P_O$ in a manner such that the distance between the stop position $P_O$ of said manuscript note 20 and the location P1 of the roller 45 which is the entrance of said switchback turning over and conveyor mechanism 47 is equal to or larger than the maximum manuscript note length L (for example, the longitudinal length of A3 size sheet), in this embodiment, it is a distance which includes the maximum document length, and margins l1 and l2.

A case where plural number of single-faced documents undergo copying in this construction is taken.

Plural originals 20 are piled-up and set on the original feeding base 18 in the order the pages with the first-page-to-be sheet P1 at the bottom and all the images faces looking downward. When this arrangement of the documents is detected by the original sensor 29, the calling roller 23 and the separating roller 25 are driven to be rotated one revolution at the same time in the direction of original feeding, so that only P1 at the bottom of the manuscript notes is separated to be fed toward the out-rollers 27 and 28. And, when the tip of the document 20 is detected by the manuscript sensor 30, the document is carried to the copying machine 10, and the timing for feeding the decalcomania paper 78 relative to the photosensitive element 77 or the like is controlled. Here, if the document fixed and optical exposure scanning method is employed, the feed of the document 20 to the stop position $P_O$ is controlled with the detection by the sensor 30 as reference. The document is carried by the transfer belt 16 on the contact glass 11, and when the top of the document reaches the stop position $P_O$, the transfer belt 16 stops, finishing the setting of the document 20. In this state, the optical scanner disposed under the contact glass 11 scans to expose the written side, so that the copying process such as forming of a latent image to the photosensitive element 77 is performed, and the developed image is transferred on the decalcomania paper 78.

When such a document exposure process is completed, the transfer belt 16 is driven again, and the document 20 is discharged and carried from the contact glass 11 toward the turning over and conveyor mechanism 31. At this point, the original 20 turns around the turn roller 32 so that the image face thereof is turned upward. And, since, in normal case, the switching claw 36 closes the reverse feed path 38, the document proceeds through the discharge passage 39 by the action of the discharging and carrying means 40. At this time, the switching claw 54 is controlled so that it shuts the normal following discharge passage, whereby the original document 20 receives the motion of the switchback turning over and conveyor mechanism 47. In other words, after proceeding to turn through the turning path along the turn roller 48, the document enters in the switchback passage 51. At this moment, the oscillating roller 52a has been moved to a position as indicated by the solid line in FIG. 4, apart from the driven roller 52b, so that it does not prohibit the original document 20 from proceeding into the switchback passage 51. Here, when a certain time passes after the passing of the end of the document 20 is detected by the sensor 55, the turn roller 48 and the like stop. In this case, the document is controlled in a manner such that although the tip of the document 20 enters in the switchback passage 51, its end rests above the turn roller 48. Then, the oscillating roller 52a is moved to a position where it contacts with the driven roller 52b, as indicated by the imaginary line in FIG. 4, and the drive directions of the turn roller 48 and the like are reversed. Accordingly, the document 20 receives the carrying force by the rollers 52a and 52b so as to proceed to the roller 53 and the discharge roller 46 with its end becoming the tip by the switchback method. In this state, the printed side of the document 20 looks down. And, the note is discharged by the discharge roller 46 onto the uppermost sheet of the documents 20 which are piled up on the document feeding stand 18 and have not been fed yet. The above described original document feeding and processing operation is conducted to the following originals in the same way. As a result, the originals are piled up on the original feeding base 18 in the order of page with the printed sides looking down as they were set at the beginning. The copied transfer paper 78 in the copying machine 10, as its flow during the processing is illustrated in FIG. 5, enters into the reverse passage once, and then is fed backward to be discharged with the copied side looking down in the order of page from the first page.

Figure 15:
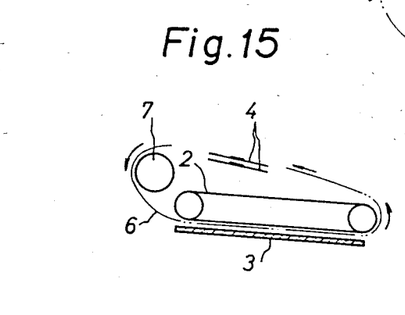
FIG. 15 is a view to help explain an original passage of loop shape of the conventional example.

The continuous carriage processing of the one side printed sheets will now described. For example, when the exposure treatment for a certain original document 20 finishes, this sheet 20 undergoes the discharge operation through the turning over and conveyor mechanism 31, and the discharging and carrying means 40. During this operation, since the distance to the switchback turning over and conveyor mechanism 47 is longer than the maximum sheet length L, if there is a foregoing sheet 20 in the switchback turning over and conveyor mechanism 47, these two sheets do not overlap each other, enabling the continuous discharging of the sheets. Especially, the turning over and conveyor mechanism 31 and the switchback turning over and conveyor mechanism 47 have different drive sources, so that if the original sheet feeding speed after the switchback turning over and conveyor mechanism 47 is accelerated 1.5 or 2 times in terms of linear velocity relative to the feeding speed by the turn roller 32, the overlapping of the original sheets will not occur. On the other hand, the sheet feeding and carrying onto the contact glass 11 is similar to the above case. The feeding of the sheet can start at the completion of the exposure of the foregoing sheet. As described above, since the original sheets 20 can be continuously carried through the passage at a speed matched with the processing speed of the copying machine 10 from the feeding to the discharging, there is not an empty carriage, and waiting time is short, improving the CPM. Meanwhile, when the single-faced originals are copied, there are following advantages by discharging the sheets through the switchback turning over and conveyor mechanism 47. First, in a case where an average RADF is employed, as depicted in FIG. 15, the original feeding base is disposed on the conveyance belt 2, and the originals or sheets 4 are carried and discharged in turn by the loop-shaped circulating passage 6. As a result, the sheets 4 are circulated time after time, so that they are likely to curl up due to the configurations of the circulating passage 6, the turn roller 7, and the like. Accordingly, this causes the overflow of the sheets out of the sheet stand, and a frequent occurence of jam. Contrarily, according to the present embodiment, as seen in the flow of the sheets 20 in FIG. 5, since the sheet is discharged after it is turned backward by the turn roller 48 in the opposite direction of the turning at the turn roller 32, the curling is cured. Particularly, these turn rollers 32 and 48 are formed having approximately same diameters, so that the remedy is effective, the return of the sheets to the sheet feeding stand 18 is preferable, and the occurence of jam is reduced.

The operation of copying the double-faced sheets 20 will be described in accordance with FIG. 6. In this case, the sheets 20 are stacked and set on the original feeding base 18 with the first page at the bottom. The feeding of the sheets to the contact glass 11 is performed in the same way as the one side printed sheets, as described with FIG. 5. However, since there are prints on both sides of the sheet, the sheet is fed with its first-page-to-be P1 looking down while the second-page-to-be P2 up. Upon the completion of copying, the manuscript 20 is carried from the contact glass 11 to the turning over passage 35 along the turn roller 32. Then, since the back side thereof, which is P2, has to be copied, the switching claw 36 has been switched to a position so that it can closes the discharge passage 39. Thus, the sheet 20 enters in the reversing passage 38 along the turn roller 32. And, since the transfer belt 16 is driven backward, the sheet 20 is set again on the contact glass 11 from the opposite direction. In this state, the side P2 looks down, and it is ready for copying. After the completion of copying, since the switching claw 36 has been already switched, like the case of one side printed sheet, the sheet proceeds through the turning over passage 35 and the discharge passage 39. However, the switching claw 54 at the entrance of the switchback turning over and conveyor mechanism 47 is in a state so that it prevents the advance toward the turn passage 50, namely the switchback turning over and conveyor mechanism 47. Thus, the sheet 20 makes a straight drive through the passage above the turn roller 48, and it is discharged on the sheet feeding stand 18 by the discharging roller 46. In this manner, the state of return is the same setting.

Figure 5:
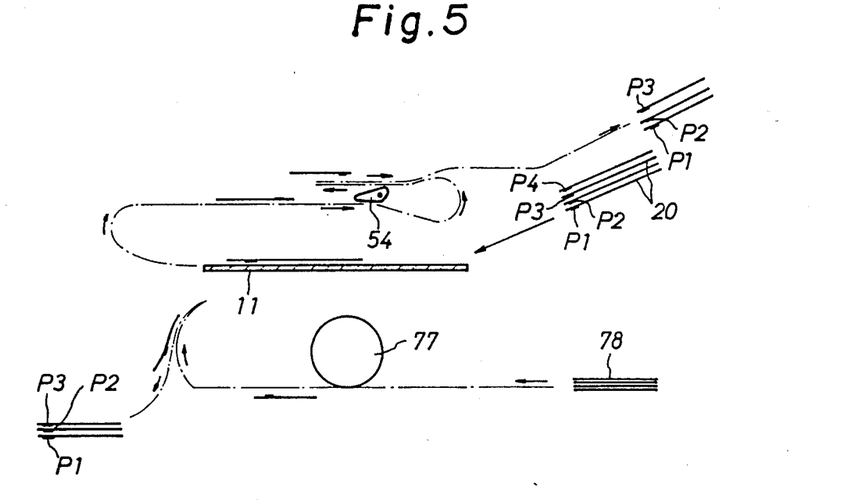
FIG. 5 is a view to help explain the original passing route of said embodiment when single-faced originals are copied.
Figure 6:
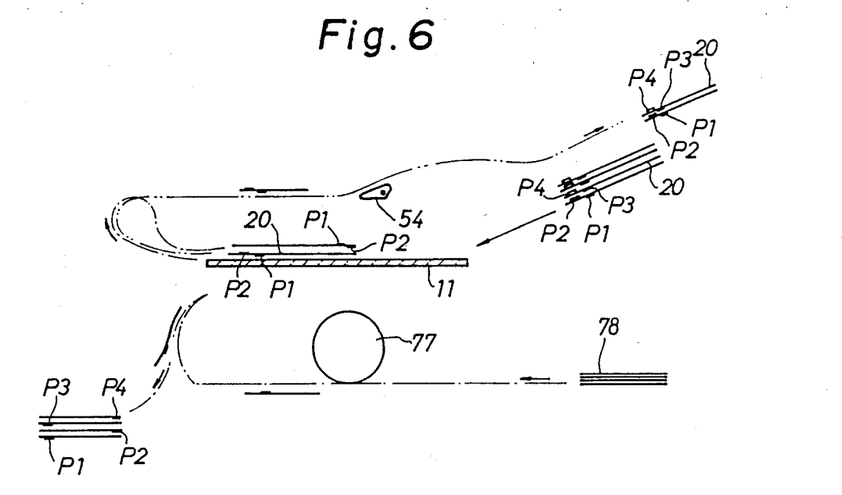
FIG. 6 is a view to help explain the original passing route of said embodiment when double-faced originals are copied.

In other words, as appreciated when FIGS. 5 and 6 are compared with each other, although the single-faced sheets and the double-faced sheets have different passages, they do not have to pass the unnecessary passage since the optimum passages can be chosen for respective case by the switching claw 54 (and the switching claw 36). Here, when the two-sided sheets are copied, since there is a process to return the sheet on the contact glass 11, until the completion of both sides exposure process for the foregoing sheet, it is not possible to continuously feed the next sheet. The process of the transfer paper 78 in the copying machine 10 is not limited to the one depicted in FIG. 6, and a process using two trays which are suited for the two-sided sheet may be employed (see FIG. 12).

Figure 7:
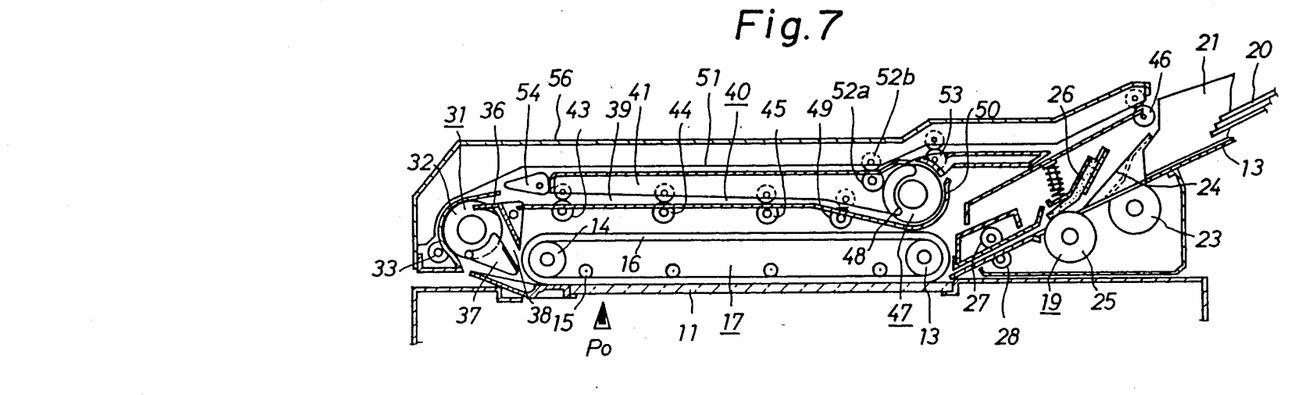
FIG. 7 is a side view showing one of the variations of said embodiment.
Figure 8:
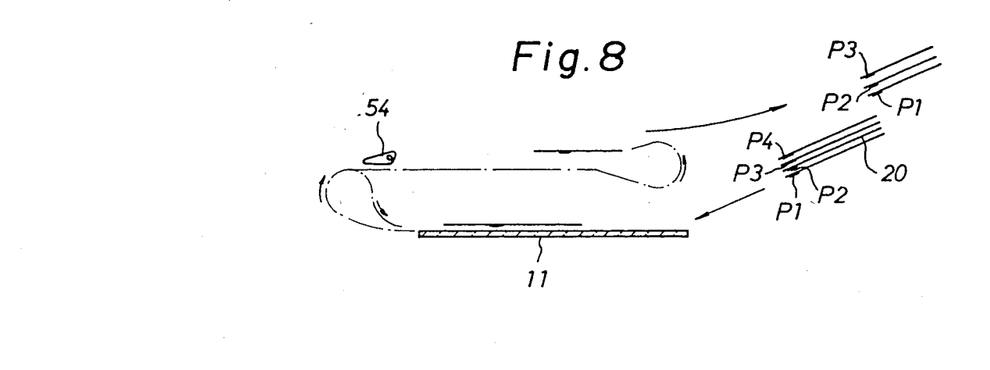
FIG. 8 is a view to help explain an original passage of said variation of FIG. 7.

The switching claw 54 would be, for example as shown in FIG. 7, would be located not near the turn-roller 48 but near the exit of the turn roller 32 of the turning over and conveyor mechanism 31, so as to perform the switching control. In this case, when the single-faced sheet is copied, the sheet flows as illustrated in FIG. 8. When the sheet is a two-sided document, it is discharged through the switchback passage 51.

Figure 2:
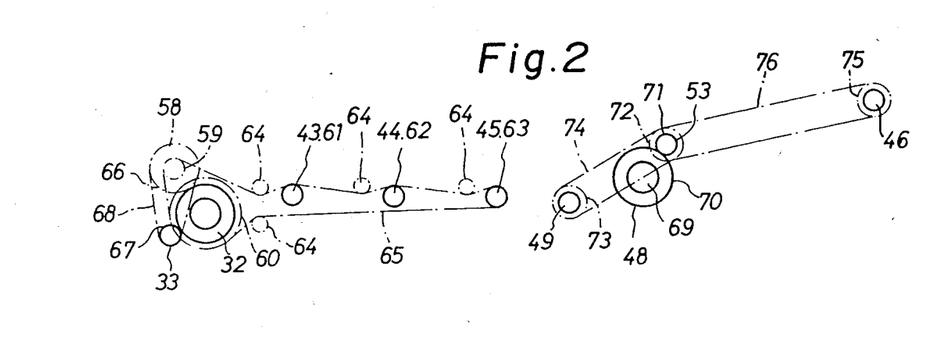
FIG. 2 is a schematic side view showing a drive and conveyance system of the apparatus shown in FIG. 1.

In one of variations of the above apparatus as shown in FIG. 7, the drive system preferably has the same construction as shown in FIG. 2. That is to say, the drive system for the carrier line from the stop position $P_o$ of the sheet tip to a position apart therefrom by the maximum sheet length, and the drive system for the carrier line downstream thereof are separated from each other, and the sheet carrying speed (linear velocity) of the the carrier line of downstream side is increased to a speed equal to or more than 1.5 times of that of the upstream side. Owing to this construction, since the speed is increased in the carrier line where there is less mechanical load, problem in terms of torque or noise will not arise. In the original separating and feeding mechanism 19, the speed of the separating roller 25 or the like is set to an optimum speed of 400-600 mm/sec so as to perform a reliable separating and feeding operation of the documents, and the document carrying speed is accelerated after turning over. Therefore, it is feasible to continuously feed the documents 20, and ameliorate CPM.

Another apparatus of this invention will be now described with FIGS. 9-12. RADF 112 is provided so as to cover the contact glass 111 disposed on the upper surface of the copying machine 110. In this RADF, there are provided a belt coveyance mechanism 117 which comprise plural presser rollers 14 and is supported between the drive roller 113 and the driven roller 114. At the right hand of upstream side of the belt conveyance mechanism 117, there are provided a document feeding stand 118 and a documentt separating and feeding mechanism 119, both being directed toward said contact glass 111. The document feeding stand 118 is disposed to incline toward said contact glass 111, and plural originals or documents 120 are piled up thereon in the order of page with the printed sides looking down. To this original feeding base 118, there are provided movable side fences 121 for positioning the original in its cross direction. On the other hand, said original separating and feeding mechanism 119 is located between the original feeding base 118 and the contact glass 111, and it includes a document feeding passage 122 which is continuous from the piling surface of said original feeding base 118 to said contact glass 111. Furthermore, there are provided a semicircular calling roller 123 of sponge which is disposed under said original feeding base 118 and has a coefficient of friction $\mu$ of 1.0, and a Mylar film 124 for pressing the document 120 onto the calling roller 123. And there are provided a separating roller 125 made up of from a material such as mu-rubber, and a separating blade 126 of urethane or the like which has a coefficient of friction $\mu$ equal to or more than 1.2 when it is pressed and contacted with the separating roller 125. Here, to the calling roller 123 and the separating roller 125, there are connected an electro-magnetic clutch (not shown). When the original document is fed, it is driven one revolution for each original, and after that it is driven by the moving document 120. To the contact glass 111 side, there is provided a pair of pull-out rollers 127 and 128.

Figure 9:
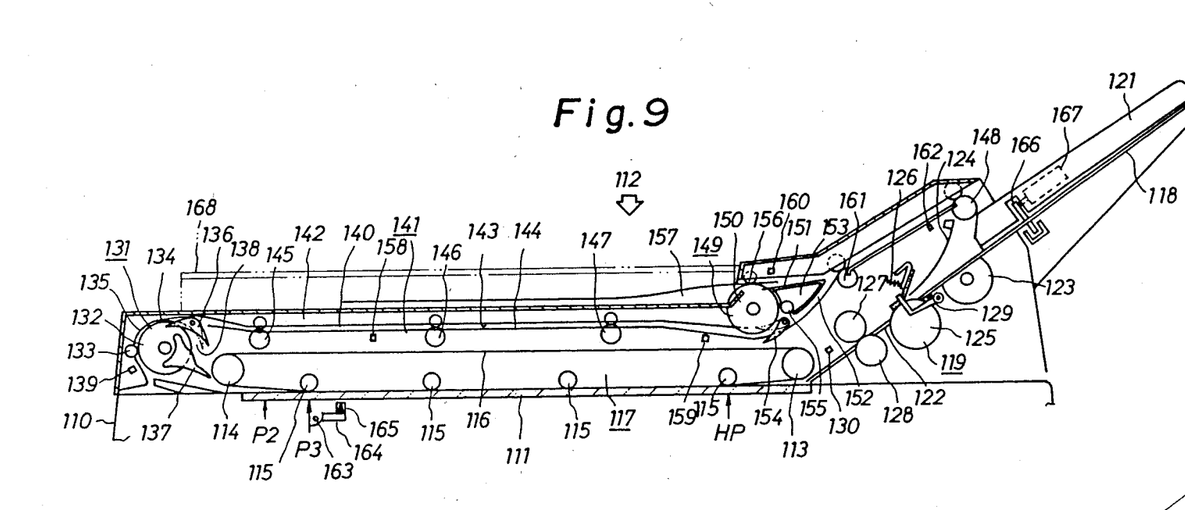
FIG. 9 is a side view illustrating another embodiment of this invention.

Between the calling roller 123 and the separating roller 125, there is provided a document sensor 129, and there is provided another document sensor 130 just before the contact glass 111.

To the left hand downstream of said belt conveyance mechanism 117, there is provided a turning over and conveyor mechanism 131. This turning over and conveyor mechanism 131 as a first turning over means is mainly constituted by a turn roller 132 of large diameter, and there is formed a turning over passage 135 along the outer periphery of the turn roller 132 by a carrier roller 133 contacted with the turn roller 132, and a turn guide 134. At the exit of the turning over passage 135, there is provided a movable switching gate 136 for switching the conveyance passage, and to the driven roller 114 side of the turn roller 132, there is provided a guide claw 137. Along the inner periphery of the turn roller 132 (conveyance belt 116 side), there is formed a backward carrier passage 138 directed to said contact glass 111. Here, there is provided a document sensor 139 just before the feeding roller 133.

Furthermore, there is provided a discharging and carrying means 141 as a second turning over means equipped with a discharge passage 140 which connets approximately horizontally the exit of the turning over and conveyor mechanism 131 where said switching gate 136 is provided, and a point above said original feeding base 118. Said discharge passage 140 is formed by a guide portion 143 of the RADF cover 142, and the guide member 144. There are provided plura pairs of rollers 145, 146, and 147, facing the discharge passage 140, and near the original document feeding stand 118 there is provided a discharge roller 148.

At an intermediate point of the dischage passage 140 of the discharge and carrier mechanism 141, there is provided a switchback turning over and conveyor mechanism 149 for selectively passing the paper. This switchback turning over and conveyor mechanism 149 as a second turning over means includes: a turn roller 150 of the approximately same diameter as said turn roller 132; a triangular guide member 153 which is disposed closer to the discharge side than the turn roller 150, and constitutes a turn passage 151 and original document straight discharge passage 152; a swithing claw 154 as a switching gate means for selectively switching said turn passage 151 and the original document straight discharge passage 152; feeding rollers 155 and 156 contacted with the turn roller 150 in the turn passage 151; and a switchback release passage 157 which is a part of an upper surface of said RADF cover 142.

At a predetermined position of the discharge passage 142 and the entrance of the turn roller 150, as well as above the turn roller 150, there are provided original document sensors 158, 159, and 160, respectively. In the direction of the tip of the guide member 153, there are provided a pair of conveyance rollers 161. In front of the discharge roller 148, there is provided a discharged document sensor 162.

In this embodiment, either one of scanning copy mode or sheet through copy mode can be selected. In the scanning copy mode, the document 120 is rested on a predetermined position P of the contact glass 111, and copied by letting an exposure optical element 164 such as a lamp 163 scan from the home position HP. In the sheet through copy mode, the exposure optical element 174 such as said lamp 163 is rested at a position just under a presser roller 115 near the driven roller 114, and the original document 120 is carried to be copied by the carrier belt 116 at a predetermined speed. Here, on said exposure optical element 164 there is mounted a resist sensor 165 facing the contact glass 111, and during scanning copy mode it functions in controlling the stop position of the document 120 while during sheet through copy mode it functions in aligning the tip of the carried document 120 and the tip of the transfer paper in the direction of the copying machine 110.

Figure 10:
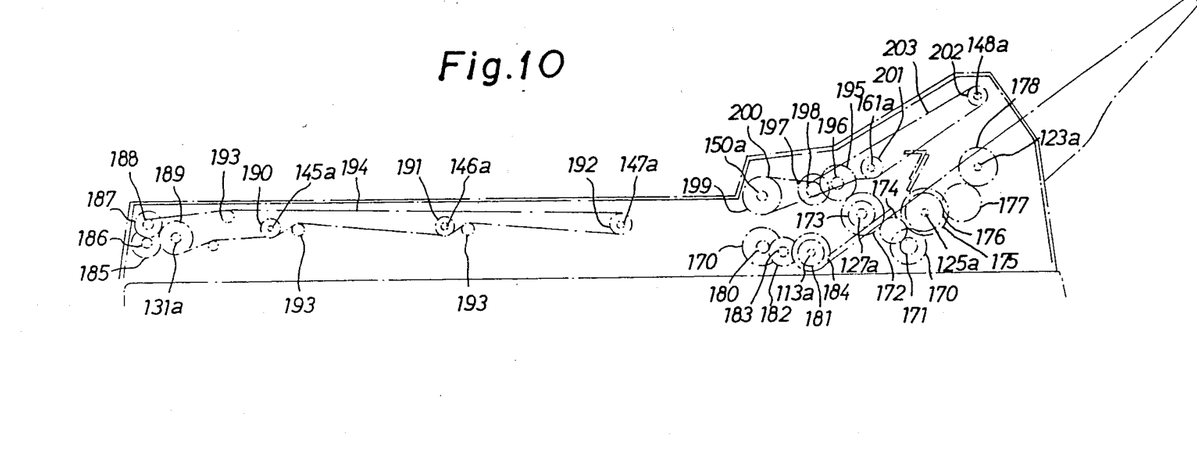
FIG. 10 is a schematic side view showing the drive and conveyance system of said another embodiment.

The construction of the drive system by RADF 112 will be now described in accordance with FIG. 10. There is provided a first motor 170 for the original separating and carrying mechanism 119. To the motor gear 171 fitted around the axis of the first motor 170, there are connected double gears 172 and 173 fitted around the pull-out roller axis 128a via an intermediate gear 174 while the gear 175 fitted around the separating roller shaft 125a is connected to the motor gear 171 via said intermediate gear 174 and to a gear 178 fitted around the calling roller shaft 123a via a gear 176 which has the same shaft as an intermediate gear 175, and an intermediate gear 177. Here, the pull-out roller 128 is provided with high pressure so that it can move the document 120 against the separating pressure of the separating element.

Furthermore, there is provided a second motor 179 for actuating the drive roller 113 of the transfer belt 116. The second motor 179 is a motor of DC servo-motor type, and a motor gear 180 fitted around the shaft thereof is engaged with a gear 181 of said crive roller axis 113a via intermediate gears 182 and 183, as well as a gear 184. Here, said drive roller 113 is driven forward or backward by the second motor 179, and its speed can be freely controlled.

In addition, there is provided a third motor 185 for driving the turning over and carrying mechanism 131 of the turn rolle 132 or the like, or a part of the discharging and carrying mechanism 141. There is provided a pulley 188 to the shaft of a gear 187 engaged with a motor gear 186 of the shaft of the third motor 185. A timing belt 194 is provided over the pulley 188, a pulley 189 of the turn roller shaft 132a, and pulleys 190, 191 and 192 of the conveyance rollers (lower side), with plural presser guide rollers 193. In this case, the conveyance speed can be changed by changing the revolution speed of third motor 185 for the turn roller 132 and other rollers.

Besides, there is provided a fourth motor 195 to the switchback turning over and conveyor mechanism 149, the discharge roller 148, and others. There is provided a pulley 198 to the shaft of a gear 197 rotated by a motor gear 196 of the shaft of the fourth motor 195, and there is provided a belt 200 between the pulley 198 and the pulley 199 of the turn roller shaft 150a. There is also provided another belt 203 between the pulley 198, a pulley 201 of the roller shaft 161a, and a pulley 202 of the discharge roller shaft 148a. The turn roller 150, the speed of the discharge roller 148 and others can be changed by changing the revolution speed of the fourth motor 195.

The turn roller 132 of said turning over and conveyor mechanism 131, and the turn roller 150 of the switchback turning over and conveyor mechanism 149 are spacialy provided with a distance longer than the maximum length of the document to be fed (for example, the longitudinal length of A3 size sheet).

In the above construction, the movement of the documents 120 stacked on the original feeding base 118 will be described. When the documents 120 are set with the written sides down in the order of page, and the switch of the copier 110 is turned on, the motor 167 of the partition plate 166 which comparts room for a set of documents 120 is turned on, moving the partition plate 166 on the documents 120. Then, the first motor 170 is driven so that by the calling roller 123 and the separating roller 125, the lowermost document 120 is separated and fed toward the pull-out rollers 127 and 128. After that, the document is carried onto the contact glass 111 by the pull-out rollers 127 and 128, and the transfer belt 116. Here, the speed of each elements are, for example: the separating roller 125 at some 500 mm/s; the pull-out rollers 127 and 128, and the transfer belt 116 at some 750–800 mm/s.

The above-described original separating and feeding operation is performed in the same way in various operation modes, and now specific cases will be described. First, the sheet through copy mode (RADF mode) will be explained. This mode is selected when, for example, in after-copying-treatment, a finisher or a doggy tail is used, so that the document and the copy maintains the relationship of 1:1. In this mode, the exposure optical unit 164 is positioned to rest judt beneath the presser roller 115 near the driven roller 114. At this state, the document 120 is moved to be pressed onto the contact glass 111 by the presser roller 115 so that the document does not rise and a nonuniformity of image picture such as jitter does not occur in exposure imaging. And, when the tip of the document 120 carried onto the contact glass 111 by the transfer belt 116 is detected by the resist sensor 165, the coveyance speed of the transfer belt 116 is switched from high to low, and the synchronization timing setting for the transfer paper supply in the copying machine 110 starts, whereby the preparation for the sheet through copy is completed. Here, if the tip of the document 120 has reached the sheet through exposure position P3 its tail is out of the pull-out rollers 127 and 128. Since the sheet through exposure position P3 is on the left side of transfer belt 116, when the conveyance during the sheet through copy is conducted by the transfer belt 116, the exposure can be performed at the constant speed without the influence of load such as a separating pressure by the separating roller 125, and the pull-out rollers 127 and 128. Thus, the image picture without jitter or the like can be obtained.

On the other hand, the tip of the document 120 which is moved to be exposed by the transfer belt 116 advances from the contact glass 111 to the turning over passage 135 and the discharge passage 140. In this case, the turn roller 132, and the transfer rollers 145, 146, and 147 are driven at a speed to or slightly slower than the speed of the transfer belt 116. Therefore, the document 120 is carried on the contact glass 111 at a constant speed controlled by the transfer belt 116 without being drawn by the turn roller 132 or other rollers.

As the conveyance of the document 120 proceeds in the above manner and when the document tip comes near the turn roller 150, during this mode, since the switching claw 154 shuts the turn passage 151, the document 120 moves along the circumference of the turn roller 150 toward the top surface of the switchback discharging path 157 which is a part of the RADF cover 143. At this time, the document end has passed over the exposure position. And, when the document end is detected by the sensor 160, the conveyance by the turn roller 150 and others stops, and then the turn roller 150 is driven in reverse mode. Accordingly, the document 120 whose forward end has gone toward the switchback discharge passage 157 is now moved from its tail toward the discharge roller 146 by the turn roller 150 by the switchback operation. In this case, the rollers 150 and 146 rotate at high speed so that the document 120 is ejected onto the document feeding stand 118 by the discharge roller 148.

Now, the feeding of the following document 120 will be described. As mentioned above, when it is detected that the end of the foregoing document 120 which undergoes exposing by the conveyance by means of the transfer belt 116 has passed by the sensor 130, and predetermined time passes, the first motor 170 is driven so that only next one document at the bottom of the pile is separated out to be fed by the calling roller 123 and the separating roller 125. When the sensor 130 detects the tip of the second document 120, the pull-out rollers 127 and 128 are switched into a low speed drive, and this document 120 is moved onto the contact glass 111 while a certain distance to the end of the foregoing document on the contact glass 111 is maintained.

In this manner, the documents 120 stacked on the document feeding stand 118 are continuously fed onto the contact glass 111 from the bottom in the order of page, undergo copying by the sheet through exposure, and are collected on the original feeding base 118 in the order of page one by one. The feeding of the final sheet of the piled-up originals is detected by the falling and rotating of the partition plate 166 due to its dead load. After the collection of the final document, the partition plate is moved and set on the top document by the motor 167, and the following cycle starts, namely the above-described operation will be repeated as much times as required to finish copying.

In the sheet through copy mode, the document 120 is moved and exposed at a constant speed by the transfer belt 116. However, if the constant speed conveyance by the transfer belt 116 is changable at various levels, copying with various reproduction ratios are possible.

On the other hand, in the scanning copy mode (ADF mode) in which the documents are fixed while the exposure optical unit moves to scan, sorters are employed for the after-copying-treatment. The scanning copy mode is chose for a case where the documents 120 are not fed repeatedly, i.e., where plural copies are made from one original, and then the copying of the next document is started. In this mode, the separated and fed document 120 is carried on the contact glass 111 at a high speed by the transfer belt 116, and when its tip is detected by the resist sensor 165, the drive of the transfer belt 116 is stopped by a predetermined plus number control by an encoder in the second motor 179, whereby the document 120 stops at a predetermined position. After the document undergoes the exposure scanning by the exposure optical unit 164 (performed as much times as required), the transfer belt 116 is actuated again so that the document passes through the turning over and carrying mechanism 131 and proceeds through the discharge passage 140. Here in this mode, since it is not necessary to collect the document 120 to the original feeding base 118 for refeeding, the document is ejected on the switchback discharge passage 157 via the turn passage 151 along the turn roller 150. That is to say, the upper surface of the RADF cover 142 is utilized as a tray. In this case, as indicated by the imaginary line in FIG. 9, it is preferable to provide a stack cover 168 such as a translucent acrylic cover so as to cover the surface of the RADF cover 142 to protect the document 120 ejected.

Figure 11:
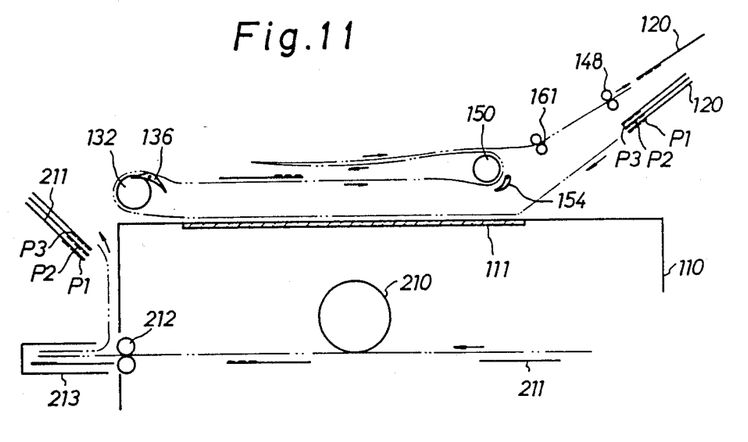
FIG. 11 is a view to help explain the paper passing route of said another embodiment when single-faced originals are copied.

Meanwhile, as the document 120, there are two types, namely single-faced document and two-sided. Operations for both types will be explained hereunder. First, in the case of one-sided documents, as depicted in FIG. 11, the original sheets are stacked on the stand 118 in the order of page with the written side looking down and the first-page-to-be P1 at the bottom. From this state, as described above, the documents 120 are fed in turn from the bottom one to the contact glass 111, and undergo the sheet through copy or the scanning copy. After that, they are moved through the turn roller 132 and the discharge passage 140. And, if the mode is the sheet through copy mode, the documents are transferred around the turn roller 150, its feeding direction is changed at the switchback discharge passage 157, and it is ejected by the discharge roller 148. If the mode is a scanning copy mode, the originals or documents are ejected on the switchback discharge passage 157. The feeding timing of the transfer paper 211 to the photosensitive element 210 is adjusted, that is to say, the paper feeding control is performed, in the copying machine 110 for the document 120, and the developing image on the photosensitive element 120 is transferred on the decalcomania paper 211. After the thusly copied decalcomania papers 211 are moved through the discharge rollers 212, they are carried into the turning over unit 213, moved reversely, and discharged on the tray (not shown), so that the copied faces look down and stacked in the order of page from the bottom.

Now, the operation for the originals 120 and the transfer papers 211 will be described when plural double-faced originals undergo a duplex copying in accordance with FIG. 12. In this case also, the originals 120 are stacked and set on the original feeding base 118 in the order of page with the first page at the bottom. The separating and feeding operation of the originals to the contact glass 111 is performed the same way as described in the case of single-faced originals. However, since the original is a double-faced one, it is fed first on the contact glass 111 with the first-page-to-be P1 looking down while the second-page-to-be P2 up. After the exposing, the original is moved to the turning over passage 135. Here, the back side or the second-page-to-be P2 has to be copied so that the swithcing claw 136 has been switched so as to close the discharge path 140. Thus, the original sheet 120 enters the reversing passage 138 along the turn roller 132. And, since the transfer belt 116 is driven in reverse mode, the original 120 is set on the contact glass 111 again from the opposite direction. In this state, the second-page-to-be P2 looks downward to be exposed. With such a movement of the original 120, the transfer paper 211 is turned over at the turning over unit 214 and once ejected on an intermediate tray 215 after copying of one side of the original is finished by the photosensitive element 210. Then, the transfer paper is fed again to the photosensitive element 120 by the feeding rollers 216 and the resist roller 217 while it is synchronized with the movement of the original 120, so as to complete the duplex copying. After the duplex copying, the transfer paper 211 is directly discharged on the tray via the discharge rollers 212. Meantime, the original 120 whose both sides are exposed is transferred toward the turning over passage 135. In this case, since the switching claw 136 has been switched, the original proceeds in the discharge passage 140. And, since the switchh claw 154 at the turn roller 150 is in a state in a manner such that it prevents the advance of the original to the turn passage 151 or the switchback discharge passage 157, the original 120 makes a straight drive through the straight path 152 and it is discharged on the original feeding stand 118 by the discharge rollers 148. According to the above operation, the collection state of the double-faced originals is the same as the state at the beginning. Here, it is noted that if the original is ejected on the switchback discharge passage 157, it is necessary to collate them later.

Figure 12:
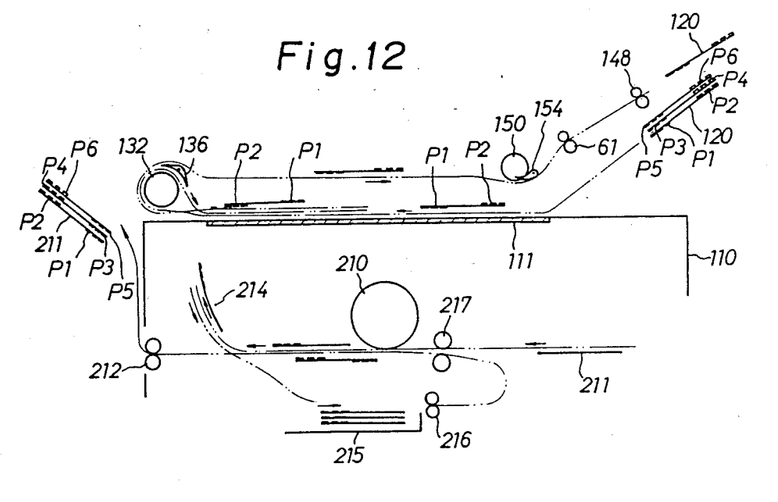
FIG. 12 is a view to help explain the original passing route when the double-faced originals are copied.

As appreciated from the comparison between FIGS. 11 and 12, the carrier passages are different from each other in single-faced originals and double-faced originals. However, since the optimum passages can be chosen by the switching claws 136 and 154, the originals do not have to pass the unnecessary pathes. In copying the double-faced originals, since there is a process that the originals 120 is fed onto the contact glass 111 from the opposite direction, it is not possible to choose the sheet through copy mode.

In any case, according to this embodiment, because of RADF 112 which enables a sheet through copy in the oder of page, the documents 120 can be continuously fed, reducing the interval between copying the individuals and ameliorating CPM. In addition to the sheet through copy mode, the scanning copy mode is available which is typical as ADF. Thus, it is used in a wide variety of ways. In either copy mode, the position of the resist sensor 165 which controls the movement of the original 120 is spaced from the paper separating and feeding unit by a distance equal to or more than the maximum length of the original so that the original is transferred at a constant speed by the transfer belt 116 without influence of separating pressure or the like. Therefore, during sheet through copy mode, it is feasible to acquire a preferable copied image without jitter and the like, and to improve the accuracy in positioning with the transfer paper tip. In scanning copy mode, it is also possible to improve the accuracy of the stop position of the original on the contact glass 111. In copying of double-faced originals, there is not any empty carrier so that the originals are moved through the possible shortest passage. Since the distance between the turn rollers 132 and 150 is equal to or more than the maximum original length, the carrier load in the discharge line is reduced. Furthermore, since the upper surface of RADF cover 142 can be utilized as the switchback discharge passage 157 or the discharge tray, for example, the document which should not be passed through the carrier passage repeatedly, can be put thereon without getting any damage.

What is claimed is:

1. An automatic original circulating and feeding apparatus having an original passage loop through which an original is conveyed, comprising:

an original feeding base disposed on said original passage loop for receiving a plurality of originals thereon, which are piled-up with image faces thereof downward;

an original separating and feeding means disposed on said original passage loop for successively separating said piled-up originals on said original feeding base one by one from a lowermost original and feeding said separated originals one by one in a separated order;

first conveying means disposed in an exposure portion of said original passage loop for conveying at a first conveying speed each of said originals to thereby expose each of said originals fed from said original separating and feeding means at an exposed position of said exposure portion;

first turning over means disposed on said original passage loop at a downstream side of said first conveying means for turning over at a second conveying speed, each of said exposed originals being conveyed by said first conveying means, and conveying at said second conveying speed each of said turned over originals, said second conveying speed is equal to or slightly slower than said first conveying speed;

second conveying means disposed on said original passage loop at a downstream side of said first turning over means for conveying at said second conveying speed each of said originals conveyed from said first turning over means;

second turning over means disposed on said original passage loop at a downstream side of said second conveying means along an original passage loop and at a position distant more than a maximum length of each of said originals conveyed thereto from said exposed position for turning over at said second conveying speed each of said originals conveyed to said distant position by said second conveying means, and conveying at a third conveying speed each of said originals turned over by said second turning over means to said original feeding base, said third conveying speed being faster than said first conveying speed and said second conveying speed; and said second conveying means, said first turning over means and said second turning over means being adapted to convey at said second conveying speed each of originals from said exposed position to said distant position.

* * * * *

UNITED STATES PATENT AND TRADEMARK OFFICE
CERTIFICATE OF CORRECTION

PATENT NO. : 4,903,085

DATED : February 20, 1990

INVENTOR(S) : Sunao Ikeda et al.

It is certified that error appears in the above-identified patent and that said Letters Patent is hereby corrected as shown below:

On the title page:

The Foreign Application Priority Data has been omitted, should read:

--Apr. 3, 1987 [JP] Japan..................62-83546--

Signed and Sealed this

Twenty-ninth Day of June, 1993

Attest:

*Attesting Officer*

MICHAEL K. KIRK

*Acting Commissioner of Patents and Trademarks*